United States Patent [19]
Billovits et al.

[11] Patent Number: 6,031,070
[45] Date of Patent: Feb. 29, 2000

[54] SOLID STATE DEVOLATILIZATION OF SYNDIOTACTIC VINYL AROMATIC POLYMERS WITH CATALYST DEACTIVATION

[75] Inventors: Gerald F. Billovits; Scott A. Tipler, both of Midland, Mich.

[73] Assignee: The Dow Chemical Company, Midland, Mich.

[21] Appl. No.: 09/016,814

[22] Filed: Jan. 30, 1998

Related U.S. Application Data

[60] Provisional application No. 60/047,504, May 23, 1997.
[51] Int. Cl.⁷ .................................................. C08F 6/00
[52] U.S. Cl. ........................ 528/491; 528/481; 528/483; 528/492; 528/500; 528/503; 526/89
[58] Field of Search ..................... 528/481, 483, 528/491, 492, 500, 503; 526/89

[56] References Cited

U.S. PATENT DOCUMENTS

| | | | |
|---|---|---|---|
| 4,758,654 | 7/1988 | Brod et al. | 528/483 |
| 5,321,122 | 6/1994 | Kuramoto et al. | 528/488 |
| 5,420,240 | 5/1995 | Kuramoto et al. | 528/488 |
| 5,426,176 | 6/1995 | Teshima et al. | 528/490 |
| 5,449,746 | 9/1995 | Teshima | 528/495 |
| 5,612,542 | 3/1997 | Brown et al. | 250/474.1 |

FOREIGN PATENT DOCUMENTS

| | | |
|---|---|---|
| 683 176 | 11/1995 | European Pat. Off. . |
| 744 410 | 11/1996 | European Pat. Off. . |
| 3-56504 | 3/1991 | Japan . |
| 3-64303 | 3/1991 | Japan . |

*Primary Examiner*—Samuel A. Acquah

[57] ABSTRACT

The present invention is an improved solid state polymer devolatilization process which comprises heating a wet feed mixture comprising polymer, residual monomer(s), process solvents and active catalyst residues in the presence of an inert gas, wherein the improvement comprises replacing the inert gas with a catalyst deactivating gas.

12 Claims, No Drawings

SOLID STATE DEVOLATILIZATION OF SYNDIOTACTIC VINYL AROMATIC POLYMERS WITH CATALYST DEACTIVATION

CROSS-REFERENCE STATEMENT

This application claims the benefit of U.S. Provisional Application Ser. No. 60/047,504, filed May 23, 1997.

BACKGROUND OF THE INVENTION

The process of the present invention relates to methods of producing syndiotactic vinyl aromatic polymers.

In the production of syndiotactic vinyl aromatic polymers such as syndiotactic polystyrene (SPS), a devolatilization step is typically used to remove residual monomers, process solvents, and other volatile components from the SPS polymer. This process is complicated by the fact that residual vinyl aromatic and other monomers can autopolymerize upon heating to form atactic vinyl aromatic and other polymers, for example, atactic polystyrene, which are unwanted contaminants in SPS polymers. Atactic vinyl aromatic polymers degrade the SPS polymer properties such as heat distortion temperature and reduce the crystallization rate of SPS homopolymer and copolymer resins.

In order to prevent discoloration of the SPS polymer, the devolatilization process is typically preceded by a deashing step to extract active catalyst residues. Deashing requires treatment of the polymer with a deashing agent such as hydrochloric acid, potassium hydroxide and the like. Alternatively, at low catalyst levels, active catalyst residues can simply be deactivated prior to devolatilization, thereby remaining in the final resin. Deactivation is typically achieved by intimate mixing of the polymer with an active nucleophilic agent, preferably a protic solvent such as methanol.

Several methods of devolatilization are known in the art, including melt devolatilization wherein the polymer is first melted and then devolatilized in the fluid state; and solid state devolatilization, wherein solid polymer is heated and devolatilized at a temperature between the glass transition temperature and the melting point of the polymer.

JP 03056504 by Yamamoto discloses a melt devolatilization process, wherein wet SPS powder containing volatiles is fed to a twin screw extruder where it is melted and devolatilized. Although volatile residues are reduced, a catalyst deactivation or deashing step is needed to prevent discoloration due to the presence of active catalyst residues.

JP 03064303 by Yamamoto discloses a two step solid state devolatilization process, wherein wet SPS powder containing volatiles is first fed to a dryer where it is heated to a temperature between the glass transition temperature and the melting point of SPS and further devolatilized by melt devolatilization in a vacuum vented twin screw extruder as described in JP 03056504, above. However, this method is very time consuming, taking 9 or 10 hours to complete, and a catalyst deactivation or deashing step is also needed.

Several methods of deashing and deactivation of active catalyst residues from SPS polymers are known. U.S. Pat. No. 5,321,122 issued to Kuramoto et al. discloses a process of purifying a styrene polymer by deashing with an alcoholic alkaline solution and washing with an alcohol. U.S. Pat. No. 5,426,176 issued to Teshima et al. discloses a process for purifying a styrene polymer by deashing with a deashing agent, for example HCl, KOH, at a temperature which is greater than or equal to the glass transition temperature of the polymer. U.S. Pat. No. 5,449,746 issued to Teshima discloses a method of purifying a styrene polymer by treating with a swelling agent, for example ethylbenzene, and a deactivating agent, for example methanol or ethanol. U.S. Pat. No. 5,612,452 issued to Teshima and Yamasaki discloses a process for simultaneously deactivating and deashing crystalline styrene polymers by treating the polymers with a poor solvent containing 15 to 10,000 ppm water. However, these methods are additional finishing steps which increase the manufacturing complexity and cost of the SPS polymer.

Therefore, there remains a need for a process of devolatilizing syndiotactic vinyl aromatic polymers which does not involve the additional operation of deashing or deactivating catalyst residues while producing polymers having reduced volatiles, reduced discoloration and improved whiteness.

SUMMARY OF THE INVENTION

The present invention is an improved solid state polymer devolatilization process which comprises heating a wet feed mixture comprising polymer, residual monomer(s), process solvents and active catalyst residues in the presence of an inert gas, wherein the improvement comprises replacing the inert gas with a catalyst deactivating gas.

This improved devolatilization process removes volatiles, including residual vinyl aromatic monomer(s), from wet syndiotactic vinyl aromatic polymer while simultaneously deactivating the active catalyst residues, such that a separate deashing or deactivation step is not needed. Surprisingly, polymers having low contents of residual monomers and other volatile components, reduced discoloration, and improved whiteness are obtained using the improved devolatilization process of the present invention.

DESCRIPTION OF THE PREFERRED EMBODIMENTS

In one embodiment, the present invention is an improved process for devolatilizing syndiotactic vinyl aromatic polymers.

As used herein, the term "syndiotactic" refers to polymers having a stereoregular structure of greater than 90 percent syndiotactic, preferably greater than 95 percent syndiotactic, of a racemic triad as determined by $^{13}C$ nuclear magnetic resonance spectroscopy.

Syndiotactic vinyl aromatic polymers are homopolymers and copolymers of vinyl aromatic monomers, that is, monomers whose chemical structure possess both an unsaturated moiety and an aromatic moiety. The preferred vinyl aromatic monomers have the formula:

$$H_2C=CR-Ar; \qquad (I)$$

wherein R is hydrogen or an alkyl group having from 1 to 4 carbon atoms, and Ar is an aromatic radical of from 6 to 10 carbon atoms. Examples of such vinyl aromatic monomers are styrene, alpha-methylstyrene, ortho-methylstyrene, meta-methylstyrene, para-methylstyrene, vinyl toluene, para-t-butylstyrene, vinyl naphthalene, divinylbenzene and the like. Syndiotactic polystyrene is the currently preferred syndiotactic vinyl aromatic polymer. Typical polymerization processes and coordination catalyst systems for producing syndiotactic vinyl aromatic polymers are well known in the art and are described in U.S. Pat. Nos. 4,680,353, 5,066,741, 5,206,197 and 5,294,685, which are incorporated herein by reference.

During polymerization of the vinyl aromatic monomer, the polymerization reaction is not typically carried to completion and a mixture of syndiotactic vinyl aromatic polymer and volatiles, such as residual monomers and process solvents, is produced. This mixture typically contains from about 2 to about 99 percent solid, non-volatile, high molecular weight polymer, preferably from about 30 to about 95 percent, more preferably from about 40 to about 95 percent, and most preferably from about 70 to about 95 percent by weight based on the total weight of the mixture. The polymer can then be recovered from this mixture using a finishing process such as devolatilization to produce resins which are useful for forming injection molded articles, films, fibers, etc. The process of the present invention is an improved solid state process for devolatilizing the syndiotactic vinyl aromatic polymer/volatile mixture, hereafter referred to as wet feed mixture.

The wet feed mixture is typically discharged from a polymerization reactor or polymer recovery system at a temperature below 100° C., typically from about 10 to about 90° C. This mixture is then devolatilized in the solid state in the presence of a catalyst deactivating gas at a temperature between the glass transition temperature (typically around 100° C.) and the melting point of the devolatilized syndiotactic vinyl aromatic polymer (typically from 200 to 320° C.). To reduce the time necessary to achieve the desired level of volatiles removal, the wet feed mixture is preferably heated to a temperature of at least 150° C., more preferably to at least 200° C.

Any means of heating can be used in the process of the present invention which will devolatilize the wet feed mixture. Examples of such heating means include but are not limited to indirect dryers, where the feed material is in contact with a metal surface heated by an appropriate heat transfer fluid, for example, disc, drum, low and high speed paddle-type, rotary, and screw conveyor dryers; kinetic energy heaters using a plow-type mixer/dryer augmented by high speed choppers, pneumatically conveyed hammer mills or batchwise operated mixer/homogenizers utilizing high speed agitators; direct dryers, which utilize a hot gas stream for heating, for example, flash dryers; all types of fluid bed dryers, conveyor-type, tray, and direct heated rotary dryers; conventional dryer/heater devices augmented with auxiliary heating technology, such as radiant infrared, microwave heating or similar technology, and combinations thereof.

The devolatilization process is performed in the presence of a catalyst deactivating gas which is a reactive gas or vapor which will deactivate the active catalyst contained within the wet feed mixture and render it inactive for further polymerization reactions. Typically, such a gas may contain the vaporized form of any active nucleophilic compound which is capable of deactivating residual active catalyst components. Such compounds include a wide variety of polar organic and inorganic compounds, such as those represented by the general chemical formula:

$$C_iH_jO_kS_lN_mX_n \tag{II}$$

wherein X is fluorine, chlorine, bromine or iodine, i is an integer from 0 to 6, j is an integer from 0 to 14, k is and integer from 0 to 3, l and m are integers from 0 to 2, and n is an integer from 0 to 6, such that all appropriate valencies are fulfilled.

Typically, a catalyst deactivating gas is also characterized by molecular weights below around 100 Dalton and has limited solubility in the polymer produced. This prevents the need for removal in a subsequent step. In order to facilitate reuse of monomers and other volatile components recovered from the devolatilization process and to prevent potential polymer discoloration, it is preferable that the catalyst deactivating gas is unreactive with the vinyl aromatic monomers and process solvents at the conditions employed in the solid state devolatilization process.

Typical catalyst deactivation gases include, water vapor, that is steam, carbon dioxide, carbon monoxide, hydrogen sulfide, sulfur dioxide, ammonia, polar organic compounds such as alcohols, aldehydes, ketones and the like, or combinations thereof. Preferably, the catalyst deactivating gas is steam. Alternatively, liquid water or the liquefied form of any of the catalyst deactivating gases, can be injected directly into the devolatilization apparatus or admixed with the incoming wet feed mixture, and thereby vaporized during heating. The configuration of the wet feed mixture, purge gas, and liquid injection ports should be arranged so as to maximize the contact time between the wet feed mixture and the catalyst deactivating gas. The catalyst deactivating gas diffuses into the polymer matrix and reacts with active residual catalyst components, thereby deactivating them and reducing subsequent color generation in the polymer. The quantity of catalyst deactivating gas necessary to achieve the desired deactivation is dependent upon the residual level of all active catalyst components in the wet feed mixture, however, considerable excess is typically used to ensure complete deactivation. The mass flow rate of catalyst deactivating gas used is typically in the range of 0.1 to 80 percent of the wet feed mixture flow rate.

Other inert gases, which have no effect upon active catalyst residues or evolved volatile components and which are not appreciably absorbed into the polymer, may also be present in addition to the catalyst deactivating gas. Typical inert gases include nitrogen, noble gases such as argon, hydrogen, alkanes such as methane and ethane, and combinations thereof. These components act as diluents and can assist in conveying volatiles out of the devolatilization apparatus and reducing the residual volatiles content in the dried product, however in order to achieve the desired level of deactivation, the molar ratio of inert gases to catalyst deactivating gas should typically not exceed 99/1.

The improved devolatilization process of the present invention can be performed at a variety of operating pressures within the devolatilization apparatus, provided that the catalyst deactivating gas can be maintained as a vapor at the temperature and pressure employed in the devolatilization process. The devolatilization process can be carried out in the presence of the catalyst deactivating gas at near-atmospheric pressure or, with appropriate design of the devolatilization apparatus, at elevated pressures. Operation at sub-atmospheric pressures is possible by application of vacuum to evacuate evolved volatiles and excess catalyst deactivating gas from the devolatilization apparatus. When water vapor is used as the catalyst deactivating gas, it is especially convenient to carry out the devolatilization process at near-atmospheric pressure using superheated steam as the catalyst deactivating and purge gas for the devolatilization apparatus.

As a result of heating the wet feed mixture, volatile components including residual vinyl aromatic monomers, are released from the polymer, vaporized, and conveyed out of the apparatus along with the catalyst deactivating gas. The residence time in the devolatilization apparatus should be sufficient to reduce the residual vinyl aromatic monomer content in the devolatilized polymer from the initial value in the wet feed mixture, typically 5 to 60 weight percent, to below 3 percent by weight, preferably less than 1 percent by weight, more preferably less than 1000 ppm, and most preferably less than 800 ppm based on the weight of the devolatilized polymer. The residence time needed in the devolatilization apparatus to achieve such a reduced volatiles level is dependent upon the original volatiles content of the wet feed mixture, the temperature in the devolatilization apparatus, the total flow rate of catalyst deactivating and inert gases, the absolute pressure in the devolatilization apparatus, and the physical characteristics of the wet feed mixture. Generally, the devolatilization is conducted under conditions such that the residence time needed to achieve the residual vinyl aromatic monomer content recited above is 24 hours or less, typically 12 hours or less, preferably 4 hours or less, more preferably 1 hour or less and most preferably 30 minutes or less.

Alternatively, a rapid heating devolatilization method can be used wherein the wet feed mixture is rapidly heated to a temperature between about 150° C. and the melting temperature of the syndiotactic vinyl aromatic polymer. Preferably, the mixture is heated to a temperature which is approximately 20° C. below the melting point of the fully dried polymer. Rapid heating can generally be performed in an apparatus capable of increasing the temperature of the wet feed mixture at an average rate of at least 10° C./minute, typically at least 10 to 1000° C./minute, preferably at least 20° C./minute, more preferably at least 30° C./minute, and most preferably at least 40° C./minute. By heating at a faster rate, the residual monomer is more likely to volatilize rather than polymerize, thus less atactic vinyl aromatic polymer is formed. When this heating process is combined with the process of the present invention, a syndiotactic vinyl aromatic polymer resin with low color and low atactic polymer content is advantageously produced.

If necessary, following the improved devolatilization process of the present invention, the devolatilized product can be further devolatilized by other solid state or melt devolatilization devices in order to further reduce residual volatile contents to the desired levels. These secondary devolatilization processes can, but are not required to be performed in the presence of a catalyst deactivating gas. Some examples of secondary solid state devolatilization devices are direct and indirect heated dryers or an insulated, gas purged, mass flow hopper or storage silo. Examples of secondary melt devolatilization devices include vacuum vented single and twin screw extruders. These units can also be used in producing formulated products by mixing additives such as antioxidants, processing aids, impact modifiers, flame retardants, fillers, for example, fiberglass, minerals, or other polymeric materials with the polymer produced to form blends or alloys.

In order to obtain reduced discoloration in the polymer produced according to the process of the present invention, it is important that the wet feed stream is not contacted with air or oxygen. Therefore, it is important that the wet feed stream and the polymer produced remain in contact with a catalyst deactivating gas or an inert gas as defined above until the desired volatiles level is achieved.

For crystallized, opaque pellets produced using the devolatilization process of the present invention, the reduced discoloration of the syndiotactic vinyl aromatic polymer can be measure according to ASTM E313 which measures a Yellowness Index or YIE. Typically, the polymer produced by the process of the present invention obtains a YIE of less than 10. Alternatively, ASTM D1925 which compares the Yellowness Index of nearly transparent extruded films of equal thickness using a light transmission technique can be used.

Residual vinyl aromatic monomer content can be determined using headspace gas chromatography with an appropriate solvent, for example, orthodichlorobenzene, by reference to samples of known composition. Atactic polymer content can be determined by Soxhlet extraction using methyl ethyl ketone, which is a solvent for atactic vinyl aromatic polymers, and a non-solvent for crystalline, syndiotactic vinyl aromatic homopolymers and copolymers. These methods are well known by those skilled in the art.

Typically, the syndiotactic vinyl aromatic polymers produced in accordance with the present invention have a weight average molecular weight (Mw) of at least 15,000, preferably at least 50,000, and most preferably from 150,000 to 500,000.

The improved devolatilization process of the present invention produces syndiotactic vinyl aromatic polymers having reduced levels of residual vinyl aromatic monomer and other volatile components, and reduced color as compared to polymers produced using conventional catalyst deactivation technology. Additionally, when steam is used as the catalyst deactivating gas in the absence of inert gas diluents, the exiting gas stream can be completely condensed, reducing the amount of potential emissions to the environment.

Although the process of the present invention is exemplified as useful in producing syndiotactic vinyl aromatic polymers, it would also be useful in polymerization processes which use other metallocene or Zeigler-Natta type polymerization catalysts which must be deactivated to reduce polymer discoloration, such as in the production of polyolefins, for example, polypropylene.

The following examples are provided to illustrate the present invention. The examples are not intended to limit the scope of the present invention and they should not be so interpreted. Amounts are in weight parts or weight percentages unless otherwise indicated.

EXAMPLE 1

A wet feed of syndiotactic polystyrene homopolymer powder at approximately 20° C. and containing 25 percent by weight volatile components (less than 1 percent by weight atactic polystyrene) is fed continuously into a high speed paddle type dryer (Solidaire™ model SJS 16-10, made by Hosokawa Bepex Corp.) having a feed zone jacket temperature of 220° C., a product discharge zone jacket temperature of 250° C., and an agitator rotational speed of 250 rpm at two different feed rates as defined below. The dryer is purged with steam, preheated to a temperature of 240° C., flowing countercurrent to the direction of the solids. The dried product is then analyzed for styrene monomer (SM) using headspace gas chromatography and atactic polystyrene (APS) content using Soxhlet extraction. The following results are obtained:

| Sample | Feed Rate (kg/hr) | Steam Rate (kg/hr) | SM Content (ppm) | APS Content (% by weight) |
|---|---|---|---|---|
| 1 | 227 | 68 | 150 | 2.5 |
| 2 | 455 | 68 | 2500 | 2.2 |

This data shows that the reduced volatiles level in SPS homopolymer powder can be substantially reduced in a solid state devolatilizing operation using steam as the purge gas.

The hot powder from the above step is then further devolatilized in a continuous, well-mixed dryer with a working volume of 0.46 m³ and a jacket temperature of 250° C., purged by a 0.57 m³/min. flow of Nitrogen gas preheated to 240° C. The further devolatilized product is characterized below:

| Sample | Feed Rate (kg/hr) | Dryer Residence Time (min.) | SM Content (ppm) | APS Content (% by weight) |
|--------|-------------------|------------------------------|------------------|---------------------------|
| 1 | 227 | 60 | 70 | 2.5 |
| 2 | 455 | 30 | 140 | 2.3 |

As shown above further reductions in residual styrene level can be achieved in a secondary dryer.

EXAMPLE 2

A wet feed of syndiotactic polystyrene homopolymer containing 25 percent volatile components, less than 1 percent atactic polymer, and active catalyst residues is fed from a polymerization reactor system inertly, without contacting air, at a rate of 25 kg/hr to a finishing process consisting of a Solidaire™ dryer (model SJS 8-4, made by Hosokawa Bepex Corp.) followed by a Werner & Pfleiderer ZSK-30 twin screw extruder, with L/D=37, equipped with two high vacuum (5 to 10 mm. Hg) vents. The dryer is operated with a feed zone jacket temperature of 188° C., a discharge zone jacket temperature of 245° C., and a rotor speed of 500 rpm. Low pressure (270 kPa) saturated steam is filtered through a 10 µm fiberglass filter (to remove particulates of rust and other potential color bodies), preheated to 270° C., and fed to the Solidaire™ countercurrent to the solids flow at a rate of 13.97 kg/hr (equivalent to a volumetric flow rate of 0.31 m³/min at 20° C.). The extruder barrel set point temperatures range from 170 to 270° C. and the extruder screw speed is 275 rpm. The powdered polymer is first devolatilized in the Solidaire™ dryer using steam as the purge gas and then further devolatilized in the extruder, crystallized, and cut into pellets.

The residual styrene content of the polymer pellets produced is 1125 ppm as measured by headspace gas chromatography while the atactic polystyrene content is 1.84 percent by weight as measure by Soxhlet extraction. The pellet Yellowness Index (YIE) is measure according to ASTM standard E313, the five sample average being 5.46.

The process of the present invention produces a SPS polymer having low residuals, low atactic polystyrene content and low color.

COMPARATIVE EXAMPLE 1

The process of Example 2 is repeated with the following exceptions:
1) Instead of steam, nitrogen is used as the purge gas at a flow rate of 0.31 m³/minute.
2) The wet feed mixture from the polymerization reactor system is accumulated in a nitrogen purged ribbon blender where it is tumbled with 2 percent by weight liquid methanol for a mean residence time of 3 hours in order to deactivate catalyst residues. This deactivated wet powder feed is then fed to the dryer and extruder as described above.

The residual styrene content of the pellets produced is 1175 ppm and the YIE is 12.35.

When a catalyst deactivating gas is not used to deactivate the catalyst during the devolatilization process, the Yellowness index is increased, even after applying catalyst deactivation processes known in the art.

COMPARATIVE EXAMPLE 2

The process of Comparative Example 1 is repeated with the following exception:
1) After the feed is deactivated by tumbling with methanol, the deactivated powder is exposed to air prior to drying and extruding into pellets.

The YIE of the pellets produced is 27.21.

This example demonstrates the importance of avoiding contact with air in minimizing color formation during finishing of syndiotactic vinyl aromatic polymers.

EXAMPLE 3

A syndiotactic vinyl aromatic copolymer consisting of 93 mole percent styrene and 7 mole percent p-methylstyrene, containing 20 percent volatile components and less than 1 percent atactic polymer, is fed directly, without deactivating catalyst residues, from a polymerization reactor system to a finishing process at a rate of 25 kg/hr. The finishing process consists of a Solidaire™ dryer (model SJS 8-4, made by Hosokawa Bepex Corp.), followed by a Werner & Pfleiderer ZSK-30 twin screw extruder, with L/D=37, equipped with two high vacuum (5 to 10 mm. Hg) vents as in Example 2. The feed zone jacket temperature of the Solidaire is 178° C., the discharge zone jacket temperature is 215° C., and the rotor speed is 500 rpm. The countercurrent purge gas to the Solidaire™ dryer consists of a mixture of Nitrogen gas and steam, which are measured separately (0.29 m³/min Nitrogen, 2.2 kg/hr steam), combined (to produce an equivalent gas flow of 0.34 m³/min at 20° C.), and preheated to a temperature of 245° C. Devolatilized powder exits the dryer and is fed to the extruder which has barrel set point temperatures ranging from 160 to 255° C. and a screw speed of 275 rpm. The crystallized pellets exiting the process have a residual styrene content of 1580 ppm and a YIE of 9.61.

(Note: It was noted that one of the two vacuum vents for evacuation of residuals in the extruder was blocked during this process. However, although the residuals are higher than the comparative below, note the significantly lower YIE.)

COMPARATIVE EXAMPLE 3

The process of Example 3 is repeated with the following exceptions:
1) Pure nitrogen is used as the purge gas fed to the dryer.
2) As in Comparative Example 1, the wet polymer from the polymerization reactor system is accumulated in a nitrogen purged ribbon blender where it is tumbled with 2 percent by weight liquid methanol for a mean residence time of 3 hours in order to deactivate catalyst residues. This deactivated wet powder feed is then led to the dryer and extruder as described above.

The residual styrene content is 980 ppm and the YIE is 14.81.

What is claimed is:

1. An improved solid state polymer devolatilization process which comprises heating a wet feed mixture comprising syndiotactic vinyl aromatic polymer, residual monomer(s), process solvents and residual active catalyst, to a temperature between the glass transition temperature and the melting point of the polymer, in the presence of an inert gas, wherein the improvement comprises replacing the inert gas with a catalyst deactivating gas.

2. The process of claim 1 where the syndiotactic vinyl aromatic polymer is syndiotactic polystyrene (SPS).

3. The process of claim 2 wherein the polymer is a syndiotactic copolymer of a vinyl aromatic monomer, wherein the vinyl aromatic monomer is selected from the group consisting of styrene, para-methylstyrene, and para-t-butylstyrene.

4. The process of claim 2 wherein the total residual monomer content of the devolatilized syndiotactic vinyl aromatic polymer is less than 3 percent by weight based on the total weight of the devolatilized syndiotactic vinyl aromatic polymer.

5. The process of claim 4 wherein the total residual monomer content of the devolatilized syndiotactic vinyl aromatic polymer is less than 1 percent by weight based on the total weight of the devolatilized syndiotactic vinyl aromatic polymer.

6. The process of claim 5 wherein the total residual monomer content of the devolatilized syndiotactic vinyl aromatic polymer is less than 1000 ppm by weight based on the total weight of the devolatilized syndiotactic vinyl aromatic polymer.

7. The process of claim 6 wherein the total residual monomer content of the devolatilized syndiotactic vinyl aromatic polymer is less than 800 ppm by weight based on the total weight of the devolatilized syndiotactic vinyl aromatic polymer.

8. The process of claim 2 wherein the devolatilized polymer has a Yellowness index according to ASTM E313 of less than 10.

9. The process of claim 1 wherein the catalyst deactivating gas is steam, carbon dioxide, carbon monoxide, hydrogen sulfide, sulfur dioxide, ammonia, a polar organic compound or a combination thereof.

10. The process of claim 9 wherein the catalyst deactivating gas is steam.

11. The process of claim 10 wherein the steam is generated during the devolatilization from liquid water which has been admixed with the wet feed mixture or injected into the devolatilization process.

12. The process of claim 1 wherein the product is further devolatilized in a secondary devolatilization process.

* * * * *